April 25, 1961 J. F. DE FRENES ET AL 2,981,144
PROMPTING SYSTEM

Filed Sept. 6, 1957 4 Sheets-Sheet 1

United States Patent Office 2,981,144
Patented Apr. 25, 1961

2,981,144
PROMPTING SYSTEM

Joseph Florian De Frenes, 100 Broadview Road, Springfield, Pa., and Horace Ludington Roberts, Port Chester, N.Y. (Contoocook, N.H.)

Filed Sept. 6, 1957, Ser. No. 682,333

5 Claims. (Cl. 88—16)

This invention relates to prompting systems of the type used by actors and speakers to provide needed aid in the delivery of dialogue, speeches and stage movements before television and motion picture cameras as well as live audiences.

Heretofore prompting devices have been relatively complicated, of considerable weight, and by reason of the driving mechanism have developed undesirable noises which limit their usefulness in conjunction with sensitive microphones and in general, when the sound is to be recorded or made part of a television program. Because of the weight of such prompting devices it has been necessary to maintain a plurality of them where the script requires the movement of the actor or participant about the stage or set.

It is an object of the present invention to provide a visual promtping system characterized by the fact that it combines reliability with light weight, so light that it can be hand-held and moved to follow rapid actor-movement from one position to another.

Further in accordance with the present invention, the prompting system lends itself to instruction to the actor or participant in learning not only the script but in mastering the pronounciation of foreign words, phrases and text. Thus the invention is not only useful as a prompting system but can be used as an educational aid. Foreign languages can be readily mastered by combining visual presentation of text with audible enunciation of the words, phrases and sentences. The advantages of the combined visual and oral presentation of the subject matter are obvious in that a person without previous training who is to appear on a program or presentation can be coached by combining with the text professionally-read presentations thereof. This can be conveniently followed by rehearsal with his own oral recording so that in one or two practice sessions he gains a professional style and competency to deliver with self-assurance the subject matter.

In carrying out the present invention in one form thereof there is provided a lightweight frame having a track for transport of a strip of material adapted to receive written matter. The frame carries a lightweight motor with driving mechanism engaging the strip to transport it along the frame. The operation of the motor is controlled preferably by a trigger arrangement operated from a pistol grip by means of which the device as a whole is supported.

A mirror extends upwardly at an angle from the strip and from an associated lamp illuminating the written matter; the mirror produces the image thereof. Preferably a magnifying lens is disposed between the mirror and the person using the prompter so that he sees an enlarged image of that which he is orally to present.

The sound record is carried by a magnetic track associated with the strip of material and a pick-up head carried by the frame rests upon this magnetic strip for reproduction of the sound record.

For further objects and advantages of the invention and for a detailed description of preferred embodiments thereof, reference is to be had to the following description taken in conjunction with the accompanying drawings, in which.

Figure 1:
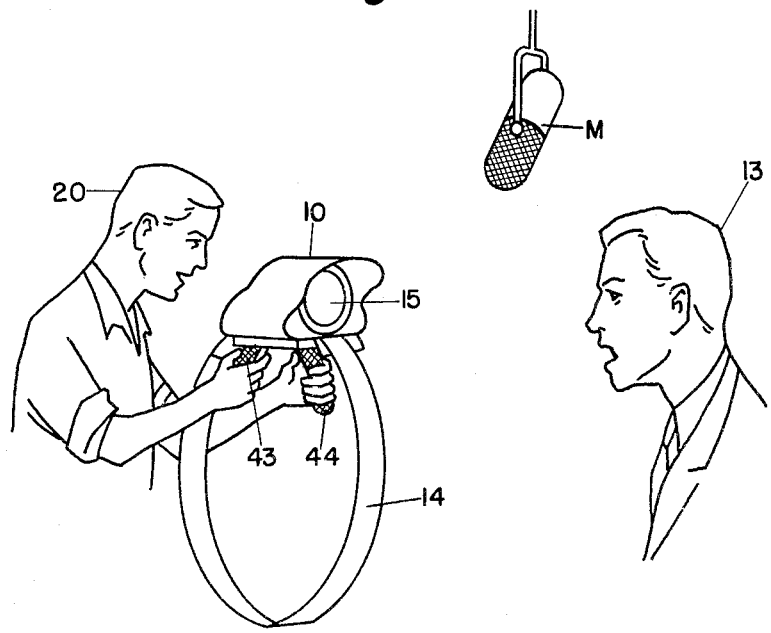
Fig. 1 is a view of the device held in the hands of an attendant by means of a double pistol grip and aimed at the actor or speaker so that he may see the text of his script as he moves freely about the stage or set.

Referring to Fig. 1, the prompting system of the present invention is self-contained in a unit 10 which in one form thereof is provided with an endless strip 14 upon which there is applied the written matter. It is to be understood that this written matter may be in the form of printed material, typewritten material, handwriting or any other type of writing and even sketches or illustrations may be recorded on strip 14, if desired. As will be later shown, a magnetic track can be included on strip 14 to provide oral prompting as well as visual prompting. An operator 20 can with either one or both hands manually support the prompting device 10, pistol-grip handles 43 and 44 being provided for that purpose. It is to be noted that the device is small and compact and, as will later be shown, it is silent in operation so that it has no effect upon the microphone M. The actor or participant at 13 may be relatively close both to the microphone M and to the prompting device or system 10. Though not essential, it is highly preferred that there be provided a magnifying lens 15 through which the participant, actor or speaker 13 views the printed matter on the strip 14.

Figure 2:
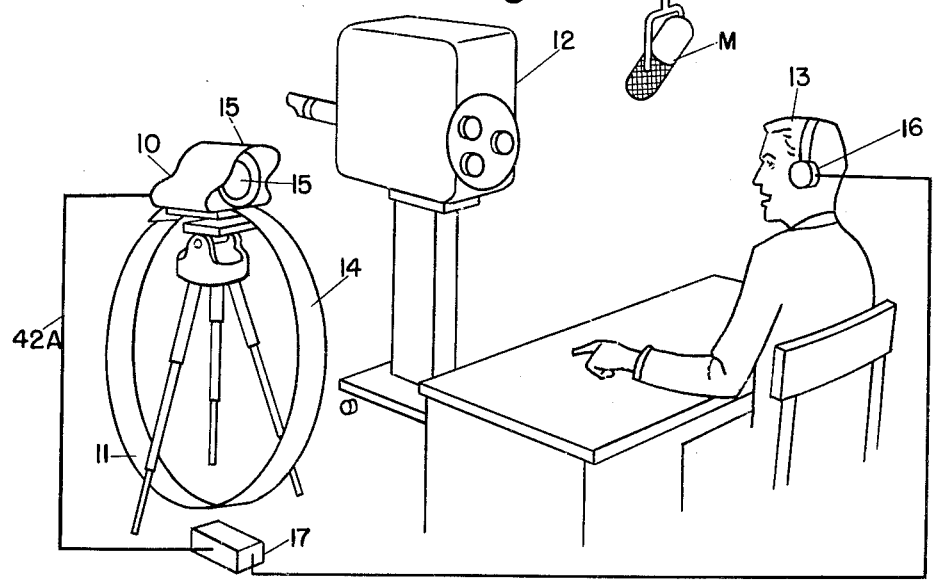
Fig. 2 is a view of the prompting device and camera when the prompter is used with a tripod placed in a position for a minimum of movement by the actor or speaker and when the actor or speaker is not required to look at the camera lens and when he may employ the use of a hearing means for receiving audio promtping as well as visual prompting.

Though the device is ideally suited for manual support, it is not limted to that application and may be supported on a tripod, as shown at 11, Fig. 2. Thus, a newscaster or other individual who is seated at a desk may view the printed matter through the magnifying lens 15 and at the same time, receive through the channel 42a signals from the sound track which, after amplification by the amplifier 17, are heard by the participant 13 through a hearing means such as the earphones 16.

The arrangement as illustrated in Fig. 2 is ideally suited for practice sessions. The participant 13 may then control the operation of the driving motor, later to be described, to regulate the speed to suit his practice session by employing any suitable remote control means well known in the art.

Where it is desired that a speaker or actor look directly into the camera 12 (whether for television or motion pictures) it will be preferred to mount the prompting device 10 with its image appearing in a mirror 18 located close to the lens 19 of the camera 12.

As a result of the illustrated arrangement, the eyes of the participant 13 do not move to and fro over the printed text but they remain stationary, as though looking directly at the audience, yet receiving visually the material he is to present to that audience.

Figure 4:
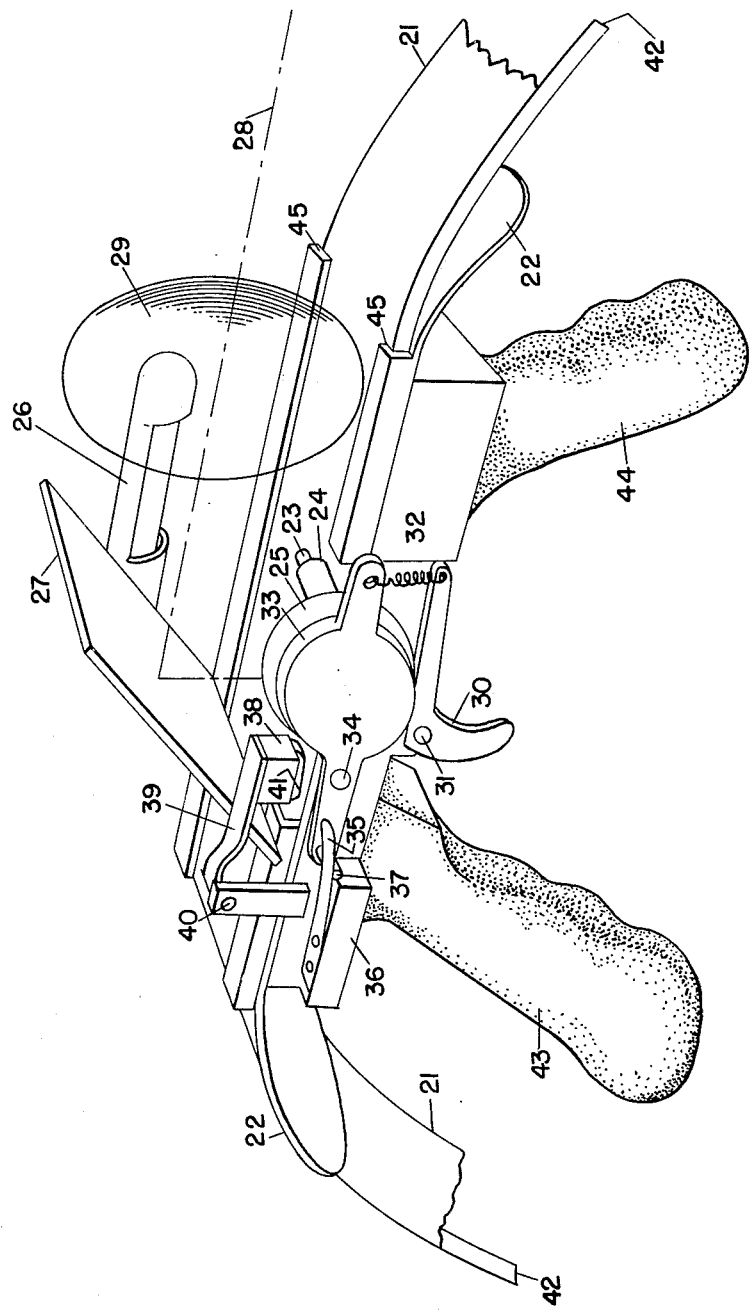
Fig. 4 is a perspective view of the prompter with pistol grips in approximate assembly to better illustrate its simplicity of construction and compactness and to further illustrate the principles of operation.

Referring now to Fig. 4, a preferred embodiment of the present invention comprises a lightweight frame from which there extend pistol grips 43 and 44 for manually supporting the prompting device. The frame includes a smooth guideway 22 for the strip 21 which it will be noted moves beneath the channels 45 which form the guides for the strip 21. The strip is moved longitudinally of the frame by means of a drive assembly which includes a driving roll 24 mounted on shaft 23 which is driven by a motor 25. Preferably the roller 24 is of soft rubber, natural or synthetic, and which develops sufficient friction to move the strip. A knurled roller could be used though the resilient plastic one is preferred.

In Fig. 4, the roller 24 is shown as extending over only a portion of the width of strip 21 which is quite adequate to provide sufficient friction to drive the strip 21 of the width shown. However, it is to be understood the length of the roller 24 can be extended where desired if greater frictional force is required or to provide a smoother drive where the principles of our invention are utilized in prompting devices in which wider strips are employed for carrying the written material. Furthermore, it is well within the scope of our invention that one or more idler rollers opposite the driving roller, though not necessary, could be utilized to provide an even more effective driving contact between the roller 24 and strip 21.

The driving assembly is so positioned on the lightweight frame that the roller 24 is fairly close to the viewing area but it is within that area. With the driving assembly positioned as shown in Fig. 4, the roller 24 is revolved in a counter-clockwise direction in order that strip 21 will be effectively pulled across the viewing area. This method is to be preferred in the driving of strip 21.

Preferably the motor 25 is of synchronous type and can be of the same design as used on electric clocks. It includes a gear train for the development of a relatively large torque at the shaft 23. The motor itself is very lightweight and adds but little to the total weight of the assembly. Relative movement is provided between the driving assembly and the strip 21 so that the driving roller 24 can be moved into and out of engagement with the strip. This is conveniently arranged by pivotally mounting the motor frame on the pivot pin 34 with motor 25 being secured to its frame. One end of a spring 32 is attached to an extension of the motor frame while the other end of spring 32 is attached to a trigger 30 which is pivoted at pin 31. The trigger 30 provides a means for the operator to pivotally position the driving assembly relative to the strip 21. When the trigger 30 is pulled, the spring 32 is elongated to press the roller 24 downwardly on the strip. If desired, the driving assembly may be biased upwardly by a spring 35 located on the mounting bracket 36, the overlying pin 37 extending from an arm attached to the frame of the motor. Though the spring 35 is shown as a leaf spring, it too can be a coil spring or a compression spring, as may be desired.

With the above operation of the roller 24 engaging and disengaging the strip 21, this prompting device will operate with a minimum amount of noise since the moving parts are kept to a minimum and very, very little noise will result from roller 24 engaging strip 21.

Figure 5:
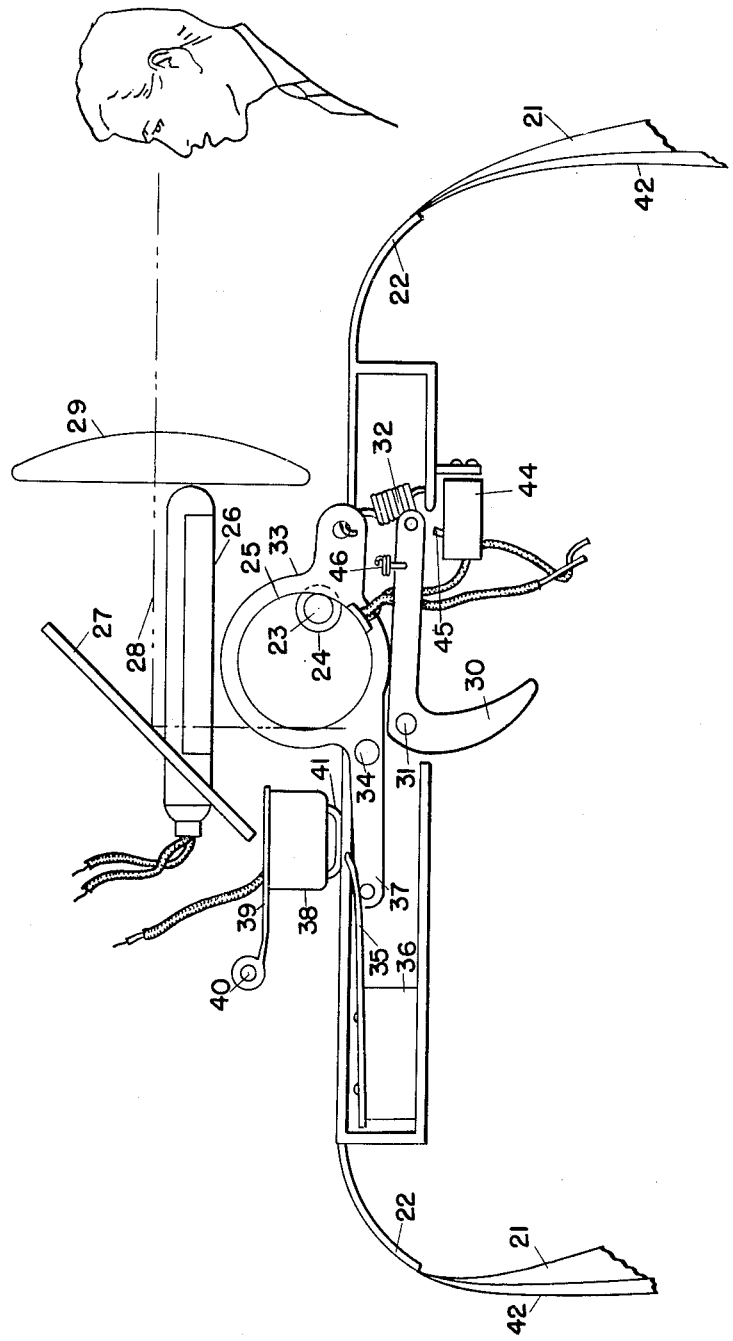
Fig. 5 is a side view of a prompting device similar to that shown in Fig. 4 but with a modified positioning and operation of the driving assembly for transporting the script.

Fig. 5 can be considered as a side elevation of the prompting device of Fig. 4 except for slight differences which have been made to illustrate an embodiment within the scope of the present invention. For example, if the spring 32 be connected to the opening in the end of trigger 30 the arrangement of Fig. 5 will function as described in connection with Fig. 4. However, with spring 32 connected to the frame to permit lifting of the drive assembly for the loading of the strip 21 in guideways 22, as illustrated, an additional spring 46 has been added to bias the trigger upwardly. When the trigger is actuated downwardly, the outer end moves into engagement with an operating element 45 of a microswitch 44. The microswitch is included in series with the motor circuit and thus serves to control the energization of the motor. Thus by opening and closing the circuit the traverse of the prompting strip 21 may be readily controlled so that the average speed or rate of movement will correspond with the rate at which the participant reads the material appearing on the strip.

The microswitch 44 may be either normally closed or normally open. If normally closed, the strip will progress at a uniform rate and its forward movement be interrupted by pulling the trigger 30. In general, it will be preferred that the microswitch be normally open so that the motor 25 will be energized upon pulling the trigger 30 and deenergized when the trigger is released. The microswitch 44 may also be of the type in which the knob 45 is actuated to close the switch and again actuated to open the switch. Thus, once the switch is actuated to close the circuit the prompting strip 21 will be moved at uniform rate until the trigger 30 is again pulled momentarily to arrest the progress of the strip 21 until a participant has caught up with the material appearing in magnified form through the magnifying lens 29.

Extending upwardly, preferably at a 45° angle, with respect to the plane of the strip 21 between the guides 45, is a reflecting mirror 27 which produces an image of the printed matter appearing in the viewing area on the face of the strip 21.

The strip 21 is illuminated as by a lamp 26 which is shaded except for a portion which restricts the light to a beam directed onto that portion of the strip known as the viewing area of the strip for best illustration of the image appearing on the mirror 27. In order that the image shall be large enough to be viewed at a substantial distance, there is positioned in front of the mirror an enlarging lens 29. This lens is disposed normal to the line 28 which, it will be observed, is parallel to the plane of the strip 21. Thus the arrangement as a whole adapts itself to the aiming by an attendant or operator so that he can aim the lens 29 towards the eyes of the actor or speaker to assure ease in reading the printed material appearing on strip 21.

The strip 21 may be of paper and thus there may be written directly thereon the text of the material to be presented. It is likewise adapted to receive sketches, symbols and other prompting configurations to aid in the presentation of the material. Since there is an image of the written matter produced by mirror 27 and it is this image that the participant views, the image perversion of the mirror must be considered. Therefore, the written matter to be recorded on the strip 21 must be in a perverted form, i.e., it must appear as an image of the writing as viewed in a mirror, so that when this matter is viewed through lens 29 as it is reproduced by mirror 27, the image of the written matter to be presented will appear in corrected form.

The subject matter to be displayed may be readily transferred or reproduced upon the strip 21 by placing a strip of carbon paper or the like on the back side of strip 21. The front or top side of the strip will then be used for the writing surface, the carbon paper being effective to place on the back side of the strip a mirror image of that which appears on the front side thereof. With the display matter recorded on both sides of strip 21, it is suitable for use in both modifications of the invention.

For the modification of Fig. 4 the back side or mirror-image representation of the prompting material will represent the viewing side of strip 21 which passes beneath the mirror 27 as from left to right. The beginning portion of the prompting material on strip 21 moves from the left to right as viewed in Fig. 4.

Figure 3:
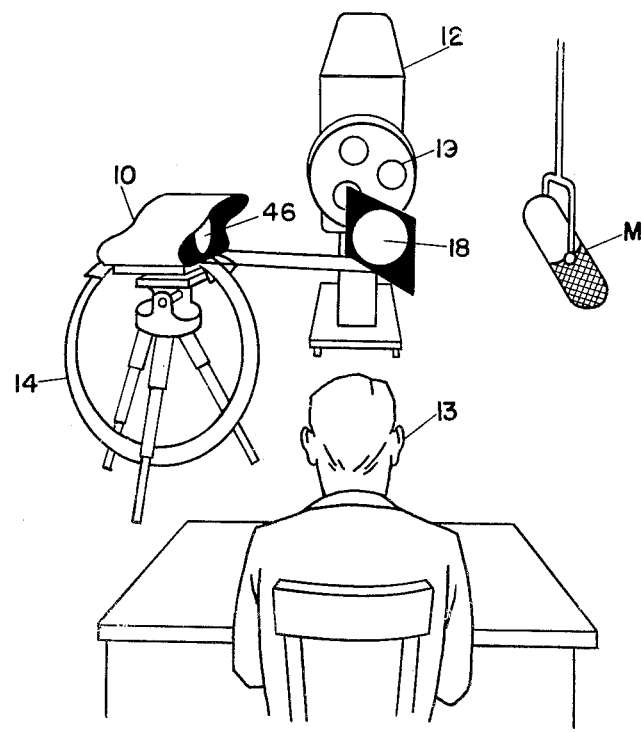
Fig. 3 is a view of the prompting device with a mirror reflector placed near the lens of the camera when the actor or speaker is required to look and talk directly to the lens of the camera.

Because of the double-image perversion incident to the use of the two mirrors in the modification of Fig. 3, the top side of the strip will be utilized (instead of the carbon paper side) and the strip will be moved from left to right, as in a clockwise direction as viewed in Fig. 3.

The present invention lends itself to oral presentation of the printed material both for rehearsal and for the mastery of foreign languages, and for other purposes. To this end the strip 21 carries a magnetic track such as illustrated at 42, Fig. 4, which moves beneath a magnetic detector in the form of a pick-up head 38 having its pole pieces resting on the magnetic track. The pole pieces are gravity biased against the magnetic track. This is accomplished by supporting the pick-up head 38 on the arm 39 pivotally mounted on the pin 40. If desired, a lightweight spring may provide the bias needed to assure intimate contact with the face 41 of the pole pieces and the magnetic track 42.

Though the track 42 may be imprinted upon the strip 21, it is not necessary to utilize this additional operation. It has been found that a strip of magnetic tape of conventional design may be adhesively secured to the strip 21 as by using an adhesive strip adapted to overlap somewhat less than half of the magnetic tape. Such an adhesive strip sold under the trade name of "Cellophane" has been found quite satisfactory for the stated purpose. If desired, the bottom surface may be provided with an adhesive coating either at the time of application to the strip 21 or prior thereto. Where the overlying strip is used, it is understood that "half track" types of pick-up heads will be used.

As stated above, the use of magnetic track 42 is very helpful as an aid in practicing the recitation of the written matter to be formally presented at a future time or may even be used in conjunction with the visual presentation of the written matter by the prompting device at the time of the formal presentation by the participant 13, if it is permissible for the operator to use the earphones at that time. The combination of the magnetic strip with the strip of written matter and passing them through the prompting device has still another application in that the magnetic tape can be used for "dubbing" sound effects. Many of the sound effects to be incorporated with the oral presentation of the participant 13 could be included on the magnetic strip 42. The response from the pick-up 38 could quite readily be fed into an amplifying means and be presented audibly to the audience of the participant 13 while the participant is making his oral presentation. Dubbing in this manner would eliminate many of the problems that arise, such as timing, when the dubbing is done from a remote source.

It is to be observed that the strip 21 in Figs. 1–3 has been illustrated as of the endless type, i.e., the ends have been secured together as by a strip of adhesively coated cellophane. The endless strip is ideally suited for rehearsals and practice runs and for the mastery of foreign languages and other printed matter.

Obviously the prompting device or system may have associated therewith supply and take-up rolls though these are not desired because of the added weight. Instead, the strip of the necessary length may be supplied and as the strip is moved through the prompting device, the leading portion of the strip may be either permitted to drop on the floor or it may be gathered up with the free hand of the operator and occasionally severed and tossed out of the way of the participant. The latter may be desirable where the action on the stage changes during the course of use of the prompting system.

While a typical embodiment of the invention has been described in detail, it is to be understood that many modifications may be made within the spirit and scope of the invention as set forth in the accompanying claims.

What is claimed is:

1. A prompting device of light weight and adapted to be hand-held for ease in movement to follow performers about the stage, said device comprising a lightweight frame having guides forming a path for transport of a strip of material having written matter thereon, a mirror carried by said frame and angularly disposed above said strip, illuminating means carried by said frame for directing light onto said strip for producing an image of the printed matter by said mirror, a lens positioned in front of said mirror for producing a magnification of said image produced by said mirror, a motor carried by said frame for driving said strip, handle means extending outwardly from said frame and for support thereof, and means associated with said motor for controlling its operation in driving the strip along the guides of said frame to change as may be desired the average speed at which the printed material appears in said mirror.

2. A prompting device of light weight and adapted to be hand-held for ease in movement to follow performers about the stage comprising a lightweight frame having guides forming a path for transport of a strip of material having written matter thereon, a mirror angularly disposed above said strip, illuminating means for directing light onto said strip for producing an image of the printed matter by said mirror, a motor pivotally carried by said frame said motor having a driving roller connected thereto for engaging said strip, means extending downwardly from said frame and for support thereof, and means associated with said motor for rotating it about its pivotal connection to said frame to move said roller into and out of driving engagement with said strip, its operation to change as may be desired the printed material appearing in said mirror.

3. A prompting device of light weight, comprising a lightweight frame having guides for transport of a strip having written matter thereon, a mirror angularly disposed above said strip, illuminating means directing light onto said strip for producing an image of said written matter by said mirror, a motor pivotally carried by said frame, said motor having a driving connection means connected thereto, said driving connection means being revolved by said motor, and a positioning means attached to said motor whereby movement of said positioning means will effect pivotal movement of said motor for engagement of said driving connection means with said strip and thereby effect transport of said strip through said guides.

4. A prompting device of light weight and adapted to be hand-held for ease in movement to follow performers about the stage, said device comprising a lightweight frame having channels forming guides for transport of a plurality of strips therethrough, which strips include a strip upon which written matter is recorded and a magnetic strip upon which sound is recorded, illuminating means positioned adjacent to said strips, a mirror angularly disposed above said strips, whereby an image of said written matter on said srtips will be produced by said mirror, a magnetic detector means positioned above said strips whereby sounds recorded on said strips may be detected and reproduced by said detector means, a motor pivotally connected to said frame, a driving connection means axially secured to said motor, a motor positioning means attached to said motor whereby said motor and said connection means may be pivotally moved to engage said strips to effect transport thereof through said guides, and handle means extending from said frame for support of said device.

5. A prompting device of light weight suitable for holding by hand by an operator comprising a lightweight frame having guides forming a path for a plurality of strips, a first strip having written matter thereon and a second strip having recorded sound thereon, a mirror positioned angularly above said first strip, illuminating means positioned adjacent to said first strip for producing an image of said written matter by said mirror, a sound detector means for detecting the recorded sound on said second strip for reproduction thereof, a strip drive assembly comprising a motor and a roller connected thereto, said motor effecting the revolution of said roller, said drive assembly being pivotally connected to said frame, a positioning means attached to said drive assembly whereby said assembly may be pivotally moved to a position where said roller will engage said strips and cause the transport of said strips through said guides, and handle means extending outward from said frame for support of said device by said operator.

References Cited in the file of this patent

UNITED STATES PATENTS

| | | |
|---|---|---|
| 1,959,038 | Ridgway | May 15, 1934 |
| 1,985,253 | Hopkins | Dec. 25, 1934 |
| 2,291,931 | Troeger | Aug. 4, 1942 |
| 2,299,738 | Collins | Oct. 27, 1942 |
| 2,317,310 | Stern | Apr. 20, 1943 |
| 2,426,184 | Deloraine et al. | Aug. 26, 1947 |
| 2,454,233 | Strumor | Nov. 16, 1948 |
| 2,598,947 | Thielen | June 3, 1952 |
| 2,635,373 | Barkau | Apr. 21, 1953 |
| 2,685,224 | Mueller | Aug. 3, 1954 |
| 2,696,753 | Segal et al. | Dec. 14, 1954 |
| 2,711,667 | Simjian | June 28, 1955 |
| 2,796,801 | Simjian | June 25, 1957 |

FOREIGN PATENTS

| | | |
|---|---|---|
| 271,416 | Great Britain | Feb. 16, 1928 |